Jan. 28, 1936.　　J. BURGESS ET AL　　2,029,221
ILLUMINATED DISPLAY APPARATUS
Filed June 6, 1934　　2 Sheets-Sheet 1
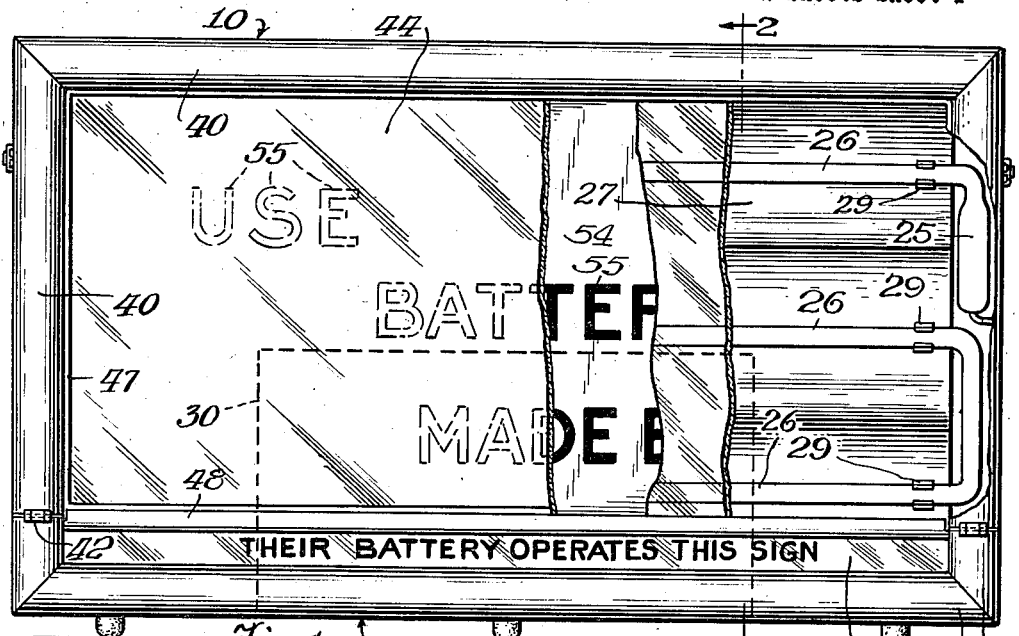
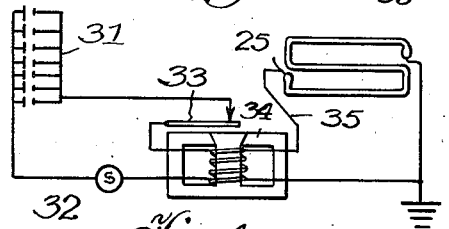
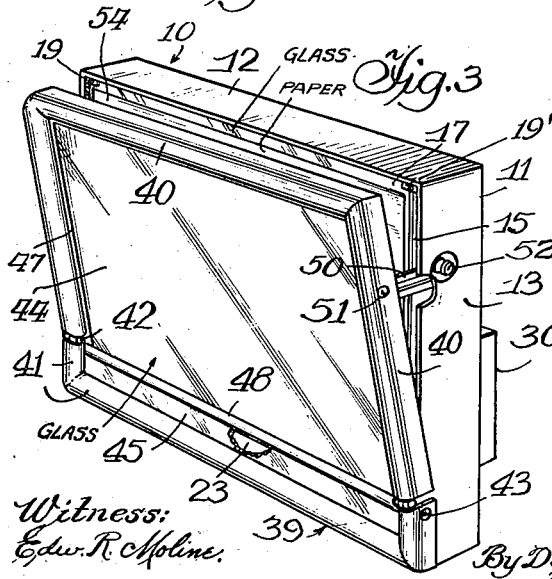
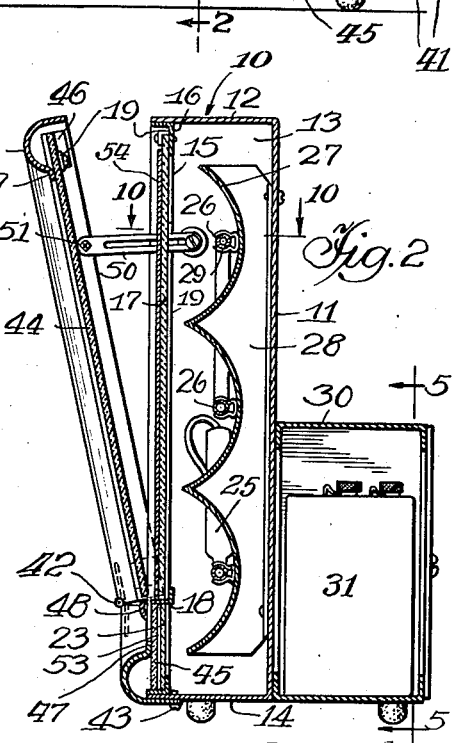
Inventors
Jackson Burgess
and Howard W. Garbe

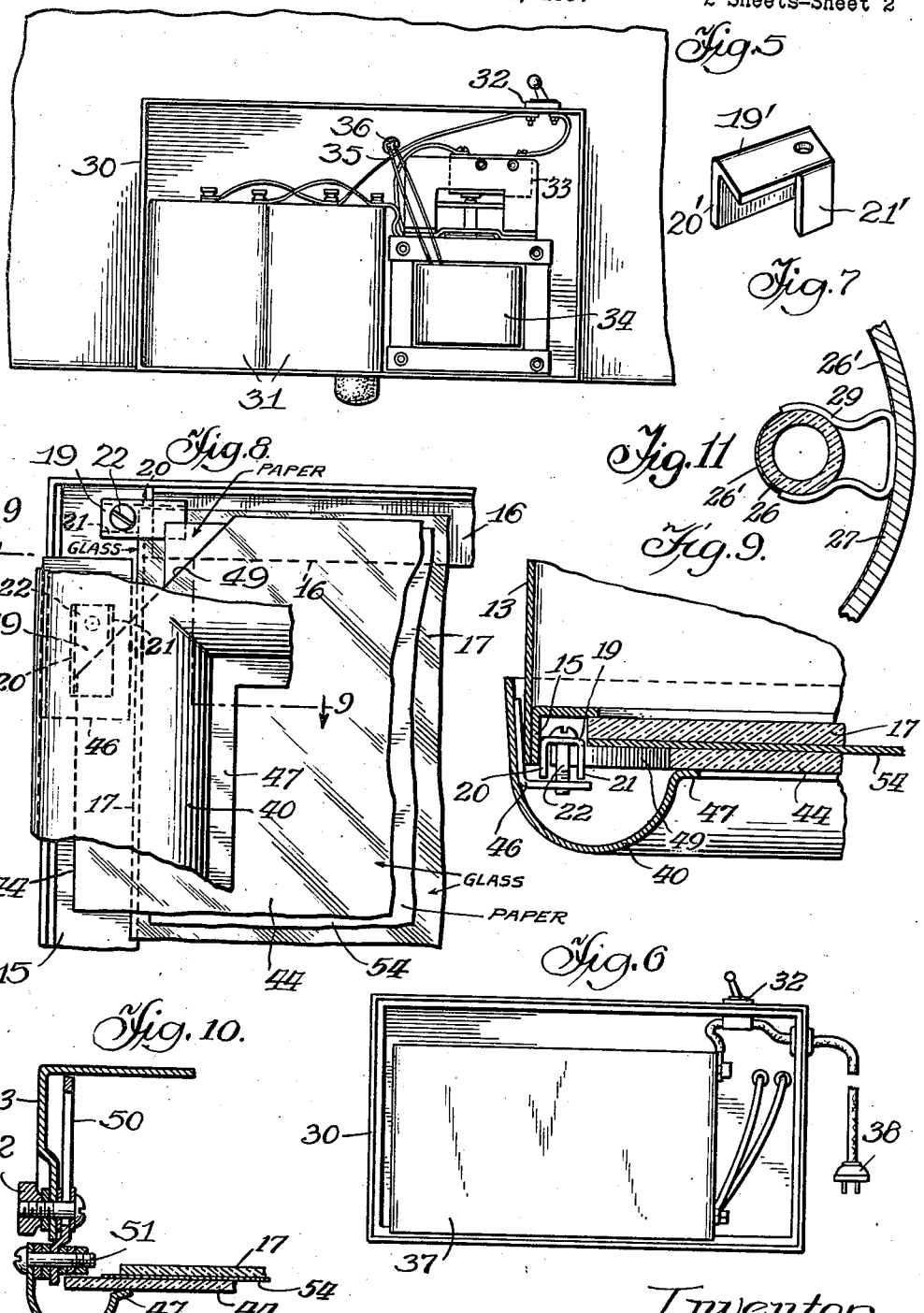

Patented Jan. 28, 1936

2,029,221

UNITED STATES PATENT OFFICE 2,029,221

ILLUMINATED DISPLAY APPARATUS

Jackson Burgess and Howard W. Garbe, Freeport, Ill., assignors to C. F. Burgess Laboratories, Inc., Madison, Wis., a corporation of Delaware Application June 6, 1934, Serial No. 729,335

7 Claims. (Cl. 40—132)

This invention relates to an illuminated display apparatus adapted for sign, signal and advertising purposes.

It is the object of the invention to provide a conveniently portable illuminated display apparatus in which the pattern, design or characters may be changed readily. It is also an object to provide such an apparatus in which the illumination is substantially uniformly distributed over the display surface thereof.

In the drawings I have illustrated a commercial embodiment of the invention.

Fig. 1 is a front view of the display apparatus with portions thereof broken away;

Fig. 2 is a sectional view on the line 2—2 of Fig. 1;

Fig. 3 is a perspective view;

Fig. 4 is a diagrammatic representation of the electrical equipment and circuits;

Fig. 5 is a fractional rear view on the line 5—5 of Fig. 2 showing one form of electrical energizing means;

Fig. 6 is a similar view showing a different energizing means;

Fig. 7 is an enlarged perspective view of a fastening device;

Fig. 8 is a fractional front view of a corner of the display apparatus;

Fig. 9 is a fractional sectional view on the line 9—9 of Fig. 8;

Fig. 10 is a fractional sectional view on the line 10—10 of Fig. 2; and

Fig. 11 is an enlarged vertical section through one of the gaseous tubes.

The apparatus comprises a portable case or cabinet 10 which may be made of sheet metal or other suitable material, having a vertical rear wall 11, a top wall 12, vertical side walls 13 and a bottom wall 14. The front of the cabinet is open except for two glass panels, one above the other in the same plane. A cover is provided for the front of the cabinet comprising a metal frame which fits over said front and is formed in two sections, as hereinafter described, the upper section being hinged to the lower section and carrying a sheet of glass which is normally held in vertical position in close proximity to the upper of the two glass panels but which may be swung away from the same as shown in Figs. 2 and 3. The lower section of the frame also contains a glass panel.

The vertical side walls of the cabinet are equipped with inwardly extending flanges or ledges 15 in the form of angle irons, one flange of each angle iron being welded to the side wall and the other projecting at right angles thereto. A similar angle iron is welded to the inside of the top wall providing a downwardly extending flange or ledge 16. A sheet of plate glass 17 or other self-sustaining, transparent material is held against said flanges, with a transverse angle iron 18 beneath it, the vertical flange of said angle iron being fastened at its ends to the flanges 15, 15, at opposite sides of the cabinet. The glass panel is held in the frame thus formed, by means of suitable clips 19, 19' as shown in Fig. 2, and also on an enlarged scale in Fig. 7. These clips are made right handed and left handed. Each clip is in the form of a channel member having flanges 20 and 21, the latter flange being cut away so that the base of the channel may overlie the corner of the glass as shown in Fig. 8, for example. This small channel member or clip is held in place by a suitable screw or bolt 22 passing through an opening therein and into one of the vertical flanges 15, as shown in Fig. 8. Each of the two bolts which hold the two bottom clips in place extend through one of the flanges of the angle iron 18 and hold it in place.

The space beneath the transverse angle iron 18 is closed by a suitable panel 23, hereinafter described, which may be made of transparent material. As previously stated, this panel is preferably in the same vertical plane as the upper glass panel 17.

Within the cabinet there is mounted a space discharge lamp or gaseous tube 25, preferably a neon lamp the tube of which is bent back and forth into a plurality of substantially parallel sections 26. To the rear of this lamp a reflector 27 is mounted which is formed preferably of concave, substantially parabolic sections, one for each section of the neon lamp. The lamp sections are located at the foci of the corresponding reflector sections. The reflector surface may be highly polished bright metal or any suitable reflecting material. Said reflector is mounted upon supporting members 28 having scalloped edges corresponding to the parabolic sections, as shown in Fig. 2, said members being mounted upon the rear wall 11 of the cabinet. The sections of neon tube are held in spring clips 29, mounted on the reflector 27.

Figs. 4 and 5 illustrate energizing means in self-contained form, which is completely portable and not dependent upon an outside source of energy such as a lighting or power circuit. This means provides an apparatus which can be made to flash at varying frequencies. The energizing apparatus is contained in a compartment 30 at the rear of case 10 and comprises a battery 31 which is connected in series with switch 32, interrupter 33 and the primary of transformer 34. The secondary of said transformer is connected in series with lamp 25 by means of conductors 35 which pass through an opening 36 in the rear wall 11 between compartment 30 and the interior of case 10. This circuit may be grounded as indicated in Fig. 4 by connecting it to the walls of compartment 30. The details of this apparatus need not be described. A suitable apparatus is described in the copending application of Howard W. Garbe, Serial No. 695,058, filed October 24, 1933. Such an arrangement may be made to give a substantially continuous light or one which flashes with substantially any desired frequency.

Where it is desired to supply the display apparatus with energy from the house wiring, a suitable transformer 37, as illustrated in Fig. 6, may be connected between the house current supply and the lamp by the usual attachment plug 38.

The light from lamp 25 is directed by reflector 27 forwardly substantially at right angles through the two transparent plates 17 and 23, constituting the front wall of said cabinet, and is distributed substantially uniformly over the areas of said plates. In order to further insure even illumination of said areas, the surface of the reflector may be coated with a flat white paint. Such reflector paints are known and available and do not reduce appreciably the reflecting power of the reflector. The front portion of the neon lamp tube lengths 26 may also be coated with a similar material 26' as shown in Fig. 11 in which the paint is shown on the reflector 27 also. The paint is applied to the surface of the lamp tube, of the correct thickness to transmit the desired proportion of light and reflect the remainder, whereby the direct light emitted forwardly by said lamp is of an intensity substantially equal to that of the light reflected by the reflector 27.

As previously mentioned, and as shown in Fig. 3, the front of the cabinet is provided with a two part cover comprising glass panels in a metal frame, which frame, designated as a whole as 39, fits over the bottom, top and side walls, overlapping the same, as shown in the lower part of Fig. 2, for example. The frame is constructed as an upper and lower section, the upper section comprising side, and top members 40. These members are almost semi-circular in cross section, as shown in Figs. 2 and 9 and are joined together at the corners, although said frame may be formed as an integral casting. The lower frame section comprises similar side and bottom members 41. The upper section is hinged to the lower section at 42. Said lower section is fastened to the cabinet by small bolts or screws 43 in the side and bottom, as shown in Figs. 2 and 3. The upper frame carries a transparent panel 44, of glass or other suitable material. The lower vertical glass panel or glass strip 23 is confined by the lower section of the frame and by the vertical flanges 15, together with a second glass panel 45 about the same size immediately in front of it, the two being pressed together between said frame and flanges.

Within the rounded frame members 40, short metal angle members 46 are secured, as for example by spot welding, as shown in Fig. 9. Another U-shaped clip 19, similar to that shown in Fig. 7, is bolted to the free flange of each of said angle members near the corners of the frame, to confine and support the glass panel 44.

The two upper clips are shown in Fig. 3. The frame members 40 have a flat margin 47, as shown in Fig. 9, against which the glass 44 is pressed and held by said clips.

A transverse bar 48 extends horizontally across the lower part of the frame to conceal the edges of the upper and lower glass plates. This bar may be secured at its ends, by spot welding, to the upright side members 40 of the lower frame section. The upper or hinged frame section is so arranged that when it is closed, its glass panel 44 is parallel with and pressed firmly against the stationary glass panel 17 mounted within the front of the cabinet. The corners of this glass plate 44 are cut off diagonally, as shown at 49 in Fig. 8, and the adjacent stationary panel 17 is of less width than said glass plate 44, in order to provide a clearance at the sides to receive the projecting fasteners 19 which hold said plate and which otherwise would prevent the plate and the hinged frame from being swung against the fixed plate. The cut away corners referred to prevent contact of the fasteners 19, at the corners of the fixed plate, with the plate in the hinged frame, as will be apparent from Fig. 8.

Means are provided for holding the hinged frame in closed position and also permitting it to be swung open a limited distance. The means comprises a slotted slide bar 50, bolted at 51 to the side members 40 of the hinged frame and which may be clamped to the side wall 13 of the cabinet by means of a thumb screw 52. See Fig. 3 and Fig. 10. A similar fastening device is provided preferably on the other side of the cabinet also.

Between the glass strips 23 and 45 in the lower frame 41, there is placed a thin sheet of translucent material 53 such as translucent paper. The characters or pattern which it is desired to display consist of substantially opaque material and are mounted on the paper by an adhesive or otherwise, or they may be printed, painted or written thereon. In like manner, a translucent sheet 54 (see Fig. 1) is located between the upper stationary glass plate 17 and the hinged glass plate 44 and has opaque characters 55 thereon. These sheets are held in place by means of the pressure between the adjacent glass plates which flatten out any wrinkles or other irregularities.

The invention provides an inexpensive display apparatus in which the display may be changed readily and without the employment of expert talent. All that is necessary is to provide one's self with the requisite sheets of translucent paper and a supply of opaque characters. It is also a simple and inexpensive matter to paint the characters on the sheet or have them printed on the same. In order to mount the display, thumb bolts 52 may be loosened and the hinged frame may be swung outwardly; the display may then be inserted in the V shaped recess presented and the cover swung back into place and fastened. The lower display is intended to be more or less permanent, carrying, for instance, the name of the person exhibiting the display. In order to mount this display, the fastening screws or bolts for the lower section of the frame or cover member are loosened while the upper frame is in the open position. This removes the pressure upon the two lower glass strips sufficiently to permit inserting the necessary sheet of paper or changing the display. The horizontal angle iron 18 prevents the upper sheet from slipping down and overlying part of the lower sheet and, in fact, prevents interference by either of the sheets with the display provided by the other. Usually, when the hinged cover frame is in the open position, the lower edge of the glass plate mounted therein is sufficiently close to the fixed glass panel to engage and support the sheet between the two glass plates, but the projecting ledge 18 insures that the sheet will not drop too far down.

Instead of using opaque characters upon a translucent background, as described heretofore, the background may be made opaque while the characters or pattern are left translucent. It is understood that the relative translucency and opacity of the different portions of the display need only be sufficient to render the characters or pattern clearly distinguishable for practical purposes. The light transmitting portions of the display may be transparent instead of translucent.

It is understood that various departures may be made from the disclosure herein without departing from the invention as recited in the appended claims. For instance, the upper and lower displays may both be made readily changeable by providing a single cover frame which is hinged along the bottom of the cabinet. While the cover frame is in the open position, the lower display will rest upon the bottom of the cabinet and the upper display will rest upon the cross ledge.

The cabinet may assume any one of a number of different forms but the one shown is advantageous in that it is high and wide as compared with its depth from front to rear. In other words, the structure is shallow but, however, it may be made as high and as wide as necessary to display the desired advertising matter, and the display surface, even though of considerable area, may be evenly illuminated without the necessity of mounting the illuminating units at a considerable distance to the rear as would ordinarily be required, and without necessitating a correspondingly deep box from front to rear.

We claim:

1. In an illuminated display apparatus, a case having a transparent front wall, a source of illumination within said case, reflecting means for distributing the light from said source substantially uniformly upon said front wall, a portion of said wall having a substantially permanent transparent cover thereupon, and a second portion of said wall having a removable transparent cover thereupon, and thin sign members held in place by pressure between said wall and said covers respectively, said sign members comprising relatively translucent and opaque portions to form distinguishable characters.

2. The illuminated display apparatus of claim 1 having means comprising a barrier between the fixed and the removable cover sections for preventing one sign member from overlying the other.

3. The illuminated display apparatus of claim 1 in which the cover is supported upon hinges, whereby said cover may be swung away from its cooperating portion of the transparent front wall.

4. A display cabinet comprising a box-like structure which is shallow from front to rear, the front wall being transparent, a horizontal strip of transparent material adjacent the bottom of said transparent front wall, a two-part frame overlying the front of said cabinet and secured thereto near the bottom, the upper part of said frame carrying a sheet of transparent material and being hinged to the lower part to swing outwardly, a sign member clamped between said horizontal strip and said transparent front wall by the lower part of said frame, a readily replaceable transparent sign member clamped between said sheet of transparent material and said front wall, and a series of vertically arranged sources of illumination within said cabinet behind said transparent wall to illuminate the latter uniformly.

5. A display cabinet comprising a box-like structure, the front wall comprising two horizontally arranged glass panels one over the other in the same plane, a frame hinged to the front of said cabinet and carrying a glass panel of approximately the size of the upper of said first mentioned glass panels whereby said panels may be brought together when said cover is swung to closed position, a thin transparent sign member clamped between said glass panels, and a second transparent sign associated with the lower of said first mentioned panels, whereby said upper sign member may be readily removed and replaced, said lower sign member constituting a relatively permanent display in conjunction with said changeable display member.

6. An advertising or display cabinet comprising a box-like structure having flanges on the inner walls near the open end thereof, a horizontal support secured to said vertical flanges above the bottom of said cabinet, a glass panel above said horizontal support and a second glass panel below the same arranged in the same plane, a cover having rearwardly extending flanges fitting over the open end of said cabinet, said cover being divided along a horizontal line forming two sections hinged to each other adjacent to said horizontal support, a glass panel carried by one of said hinged members of a size corresponding to the adjacent fixed glass panel whereby a transparent advertising sheet may be inserted and clamped between said panels.

7. An advertising or display cabinet comprising a box-like structure having flanges on the inner walls near the open end thereof, a horizontal support secured to said vertical flanges above the bottom of said cabinet, a glass panel above said horizontal support and a second glass panel below the same arranged in the same plane, a cover having rearwardly extending flanges fitting over the open end of said cabinet, said cover being divided along a horizontal line forming two sections hinged to each other adjacent to said horizontal support, a glass panel carried by one of said hinged members of a size corresponding to the adjacent fixed glass panel whereby a transparent advertising sheet may be inserted and clamped between said panels, clips securing the corners of each of said adjacent glass panels to its supporting structure, said glass panels being of a size to provide a clearance on certain sides to accommodate the clips of the other glass panel and prevent interference when said panels are brought together.

JACKSON BURGESS.
HOWARD W. GARBE.